United States Patent [19]
Utley

[11] Patent Number: 5,706,546
[45] Date of Patent: Jan. 13, 1998

[54] TOOL FOR SCOOPING AND SCRAPING MATERIAL FROM CONTAINERS

[76] Inventor: Dale M. Utley, 17015 N.E. 32nd St., Bellevue, Wash. 98008

[21] Appl. No.: 738,834

[22] Filed: Oct. 28, 1996

[51] Int. Cl.$^6$ .................................................. A47L 13/02
[52] U.S. Cl. ................. 15/236.01; 15/143.1; 15/236.09; 294/55
[58] Field of Search .................... 15/104.001, 143.1, 15/236.01, 236.05, 236.07, 236.09; 294/55, 131

[56] References Cited

U.S. PATENT DOCUMENTS

| | | | |
|---|---|---|---|
| 2,114,703 | 4/1938 | Conner | 294/55 |
| 4,627,128 | 12/1986 | Shea | 15/104.001 |
| 4,674,186 | 6/1987 | Galliano. | |
| 4,751,762 | 6/1988 | Meimeteas | 15/143.1 |
| 4,768,254 | 9/1988 | Bell | 15/143.1 |
| 4,987,635 | 1/1991 | Young | 15/236.01 |
| 5,095,573 | 3/1992 | Henke et al. | 15/236.07 |
| 5,319,823 | 6/1994 | Baum et al. | 15/143.1 |
| 5,345,642 | 9/1994 | Faldetta | 15/236.05 |

*Primary Examiner*—Terrence Till

[57] ABSTRACT

A hand tool for scooping semi-viscous, viscous, and dry materials out of containers. Blade members are provided on the tool for scraping materials from the interior walls and bottom sections of various shaped and sized containers. The handle of the tool has a deflector plate, extending from the lower portion of the handle which prevents the materials in the container from contaminating the user's hands. The tool has a hook to hang the tool onto the upper lip of the container for temporary storage of the tool when in use.

3 Claims, 2 Drawing Sheets

TOOL FOR SCOOPING AND SCRAPING MATERIAL FROM CONTAINERS

BACKGROUND—FIELD OF THE INVENTION

This invention relates to a tool for removing viscous, semi-viscous, and dry materials from cylindrical and semi-cylindrical containers of a variety of shapes and sizes.

BACKGROUND—DESCRIPTION OF PRIOR ART

Past known devices have provided various solutions for removing materials from the interior wall or bottom section of cylindrical containers. U.S. Pat. No. 4,627,128 to Shea (1986) and U.S. Pat. No. 4,987,635 to Young (1991) are generally designed with lower blade members that are only used with cylindrically shaped containers. Other devices offer blade members designed for scraping the walls of cylindrical containers of a specific size, as in U.S. Pat. No. 5,345,642 to Faldetta (1994). U.S. Pat. No. 5,345,642 to Faldetta (1994) may work well with a 1 gallon container, but may be ineffective with a 3½ gallon, 4 gallon, or 5 gallon container. Other devices scrape the interior walls of a variety of containers, but fail to provide a means to efficiently clean materials from the bottom section of the container. U.S. Pat. No. 4,674,186 to Galiano (1987) is designed with such substantial length that the handle portion is always kept outside the container. While this may initially appear to be logical in keeping the user's hand out of the interior of the container, in reality, the device could be too long to use effectively. If the user is working with a 5 gallon container, for example, the device would be so long that the user would not have enough leverage to easily clean the bottom of the container. With this size device, the user's hands would become fatigued very quickly.

Most of these devices provide a means for scraping residual material from the walls or bottom sections of cylindrical containers, but do not facilitate the user a means to effectively remove or scoop out materials when the container is full.

Previous devices have not offered a convenient method of temporary storage when they have been contaminated with viscous or dry materials. The user must find a safe area to lay the device down so as not to contaminate the general area where the device is laid. The user may place the known device back inside the container for temporary storage, but the device may fall into the material in the container. Previous devices are usually designed with an elongated handle that is directly attached to the lower blade member, however, they do not include a device to help prevent the user's hand from inadvertently contacting materials that are on the scoop of the device.

SUMMARY OF THE INVENTION

The present invention overcomes the disadvantages of the prior art by providing a hand tool which effectively removes viscous materials and dry materials from the interior, sides, and bottom sections of various shaped and sized containers.

The hand tool has a concave designed scoop allowing the user to remove and hold materials from full containers. Parallel blade members at the sides of the scoop and a blade member at the lower end of the scoop allow the user to remove and scrape materials from the sides and bottom section of various shaped containers. The blade member at the lower end also allows the user to scrape the material from flat surfaces to retrieve excess material to be recycled back into the container.

A hook device positioned immediately at the upper end of the neck allows for storage. The hook device would allow the user to hang the hand tool on the upper lip of the container, keeping the tool on the inside of the container. Because the hand tool would be stored inside the container, any materials that fall off the hand tool would remain within the container. The hook device is positioned above the scoop and below the handle. This provides for storage of the hand tool and keeps the handle above the upper lip of the container, preventing the handle from coming in contact with materials in the container.

The present invention contains a deflector plate, between the lower portion of the handle and the neck, which prevents the user's hand from inadvertently contacting materials on the scoop or neck.

The features and advantages of the present invention will become apparent from the following detailed description of the invention when read with the accompanying drawings.

Figure 1:
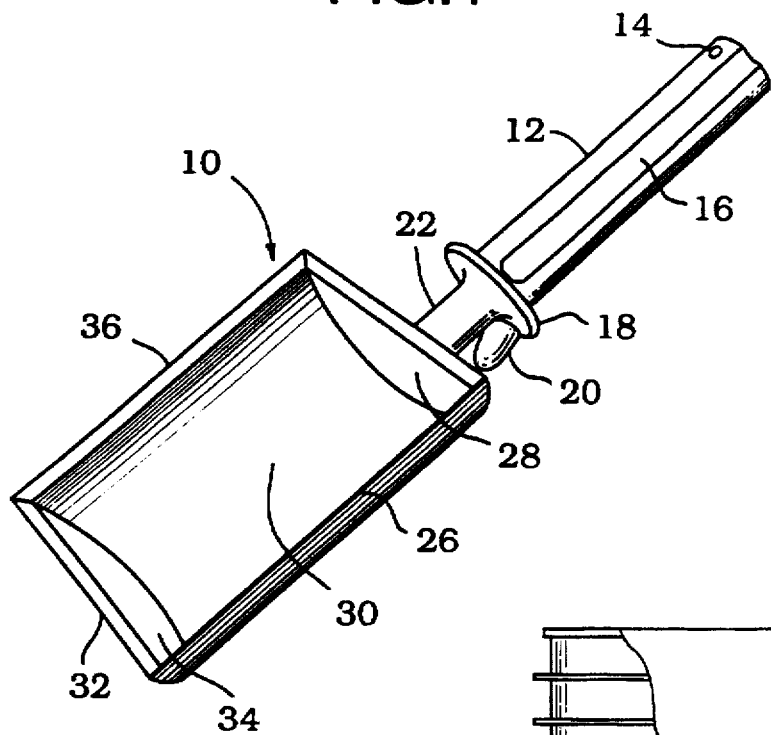
FIG. 1 is a top, front, and side perspective view of the present invention.

| Reference Numerals In Drawings | | | |
|---|---|---|---|
| 10 | tool | 12 | handle |
| 14 | hole | 16 | handle grooves |
| 18 | deflector plate | 20 | hook |
| 22 | neck | 26 | left blade member |
| 28 | upper blade member | 30 | scoop |
| 32 | tapered edge | 34 | lower blade member |
| 36 | right blade member | 40 | cylindrical container |
| 42 | semi-cylindrical container | 50 | material |

DETAILED DESCRIPTION OF A PREFERRED EMBODIMENT OF THE PRESENT INVENTION

Figure 2:
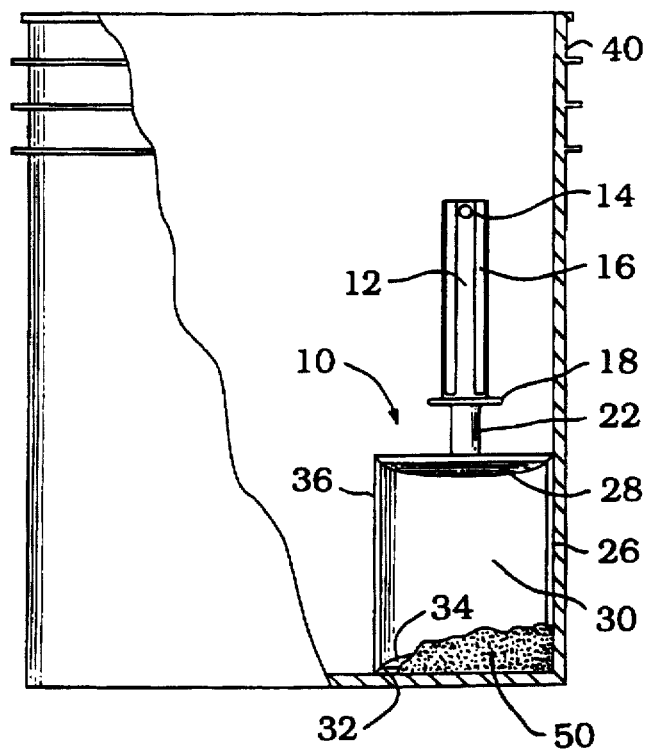
FIG. 2 is a side view of the tool of the present invention in use within a cylindrical container with a portion of the wall on the container cut-away for clarity.
Figure 3:
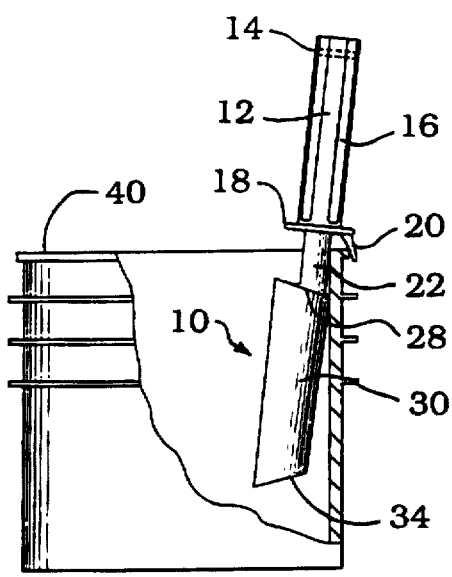
FIG. 3 is a side view of the tool of the present invention hung on the upper edge of the container as viewed from a cut-away portion of the container.
Figure 4:
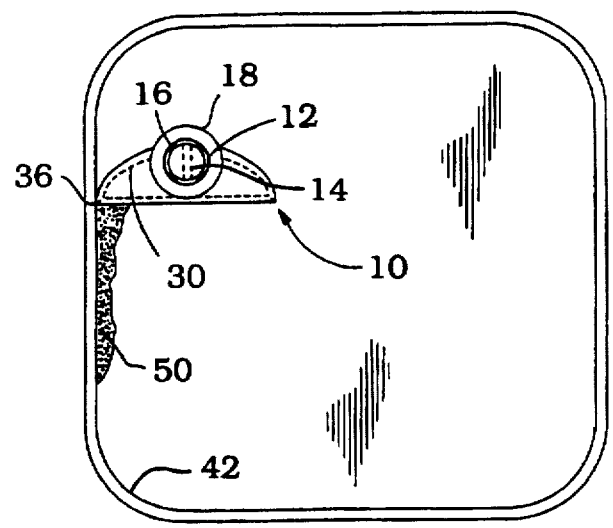
FIG. 4 is a top view of the present invention in use within a semi-cylindrical container as viewed from the top opening of the container.

Referring generally to FIGS. 1 through 4, there is shown a tool 10 embodying the present invention for scooping, removing, and cleaning viscous materials 50 and dry materials 50 from cylindrical 40 and semi-cylindrical 42 containers. The tool 10 is produced of strong injection molded plastic material of a type that is unaffected by common solvents used in the construction industry and is safe for cleaning by use of a common dish washing machine and detergents. In the preferred embodiment, the tool 10 consists of a scoop 30 with a semi-cylindrical shape with two parallel side blade members 26, 36 for scraping materials from the sides of containers 40, 42. At right angles to the side blade members 26, 36 is a lower blade member 34 for scraping materials 50 from the bottom side of containers 40, 42 or flat surfaces. At right angles to the side blade members 36, 26 is an upper blade member 28 on the top portion of the scoop 30 to prevent the material 50 from falling off the top side of the scoop 30 when the scoop 30 is full of material 50 that has been removed from within the container 40, 42. This upper blade member 28 is extremely helpful when using the preferred embodiment for the removal of viscous materials 50 from a full or partially full container 40, 42. Blade members 26, 34, 36 have tapered edges 32 to help facilitate the scraping of material 50 from the interior of containers 40, 42. FIG. 4 shows the lower blade member 34 is angled slightly inward toward the interior of the scoop 30, keeping the back side of the lower blade member 34 away from the tapered edge 32 while the tool 10 is in use.

Immediately above the scoop 30 portion is a neck 22 which helps separate the handle 12 from the scoop 30. This helps prevent materials 50 from contaminating the user's hand. Attached at the extreme upper portion of the neck 22 is a flat deflector plate 18 that helps prevent the viscous materials 50 on the scoop 30 from contaminating the user's hand. The deflector plate 18 has an outer perimeter the runs perpendicular to the longitudinal axis of the neck. This deflector plate 18 also acts as a stop to prevent the user's hand from slipping down the handle 12 of the tool 10 into the contaminated area of the scoop 30 and neck 22.

As shown in FIG. 3, connected to the outermost portion of the deflector plate 18, is a hook 20 that extends parallel to the longitudinal axis of the neck 22 and points down towards the bottom end section of the tool 10 to allow the user to hang the tool 10 on the upper lip of the container 40, 42 for temporary storage. The tool 10 would typically be hung on the interior of the container 40, 42 so that any viscous materials 50 that may fall off the scoop 30 portion of the tool 10 would be recycled back into the container 40, 42. This would allow the user a convenient place to temporarily store the tool 10 and be able to recapture any materials 50 that inadvertently fall off the tool 10. This means of storing the tool 10 would also help keep the work area clear of inadvertent fall-off of materials 50.

Immediately above the deflector plate 18 is a handle 12 of sufficient length to allow the user to hold the tool 10 while in use. The handle 12 is generally parallel to the left and right blade members 26, 36, which allows the use of the tool 10 by both right and left handed users. Parallel to the length of the handle 12 and recessed into the handle 12 are handle grooves 16. Concave and linear in shape, these handle grooves 16 aid in gripping the tool 10 while the user scrapes the interior walls of a container 42, 42, helping to prevent the tool 10 from spinning in the user's hand. At the upper end of the handle 12 a hole 14 is provided to allow the display of the tool 10 for merchandising purposes.

When using the tool 10 as a scoop device, the user grabs the handle 12 and inserts the scoop 30 portion of the tool 10 in to the mass of material 50 from within the container 40, 42. The user would then draw out the necessary amount of material 50 from the container 40, 42 by holding the material 50 within the inner portion of the scoop 30. The material 50 is then transferred from the container 40, 42 to the area of choice and released by the user of the tool 10. The tool 10 is then temporarily stored inside the container 40, 42 by hanging the tool 10 on the upper edge of the container 40, 42 by the tool's hook 20. This process is repeated until the container 40, 42 is nearly empty.

Once the container 40, 42 is nearly empty, the user may then use the tool 10 as a scraping device as best illustrated in FIG. 4. The user holds the handle 12 and rests either the left side blade member 26 or the right side blade member 36 against the interior wall towards the top of the container 40, 42. The user then begins rotating the tool 10 around the interior walls of the container 40, 42, scraping the walls clean of material 50. If the user is holding the left side blade member 26 against the interior wall, then the tool 10 is rotated in a clockwise motion. If the right side blade member 36 is held against the interior wall, then the tool 10 is rotated in a counter clockwise motion. Depending on the viscosity level of the material 50, the material 50 will either collect within the interior portion of the scoop 30 or will fall inward toward the bottom of the container 40, 42.

If the material 50 collects within the interior of the scoop 30, the user may proceed by using the material 50 collected. If the material 50 begins to collect in the bottom of the container 40,42, the user may collect this material 50 by placing a side blade member 26,36 against the interior side wall of the container 40,42 and the lower blade member 34 against the interior floor of the container 40, 42 as seen in FIG. 2. Because the lower blade member 34 is at a right angle to the left and right blade members 26, 36, the tool 10 will scrape both the side wall and the bottom floor of the container 40,42 with the same rotating motion. It may be necessary to tilt the opening of the container 40, 42 toward the user so the material 50 can gather in the bottom corner of the container 40, 42 to aid in scooping up the last portion of the material 50.

Because of the varying viscosities and weight of materials 50, the tool 10 could be made in a variety of sizes. Heavy materials 50, such as mastic adhesives, should allow for a tool 10 designed of a shorter length or smaller scoop 30 design, giving the user the proper leverage needed so as not to fatigue the user's hand. Lighter materials 50, such as dry powders, may warrant a larger scoop 30 design. Particular industries may prefer the scoop 30 to be used as a measuring device. An example of this may be a scoop 30 of a predetermined size for food handling where the user is using the tool 10 to draw a food product from a container 40, 42 in a pre-measured volume.

Although the description above contains many specificities, these should not be construed as limiting the scope of the invention, but as merely providing illustrations of some of the presently preferred embodiments of this invention. For example, the tool has been described for use in removing viscous materials from cylindrical containers. It is to be understood that the tool is not so limited, and that it comprises other similar tools for removing any type of viscous, semi-viscous, solid, or semi-solid material from any container. Other various modifications, thereto, will become apparent to those skilled in the art to which it pertains. Thus, the scope of the invention should be determined by the appended claims and their legal equivalents, rather than by the examples given.

What is claimed is:

1. A hand tool for the scooping and scraping of viscous, semi-viscous, solid, and semi-solid materials from containers, wherein said hand tool comprises a scoop with a semi-cylindrical shape designed for various sized and shaped containers, a handle, a hook for storage, a deflector plate, and a neck having a longitudinal axis to isolate said handle from said scoop, said hook and said deflector plate being located between said handle and said neck; and wherein said tool is comprised of injection molded plastic of a type that is unaffected by common solvents used in the construction industry and is safe for cleaning by use of a common dish washing machine and detergents.

2. The tool of claim 1 wherein said deflector plate is centered at the uppermost portion of said neck wherein an outer perimeter of said deflector plate runs perpendicular to the longitudinal axis of said neck.

3. The tool of claim 1 wherein said deflector plate has attached said hook that runs parallel to the longitudinal axis of said neck and points down toward the bottom section of said scoop.

* * * * *